June 18, 1968  J. G. DORRANCE  3,388,674
TOW TRUCK SYSTEM
Filed Sept. 9, 1965  2 Sheets-Sheet 1
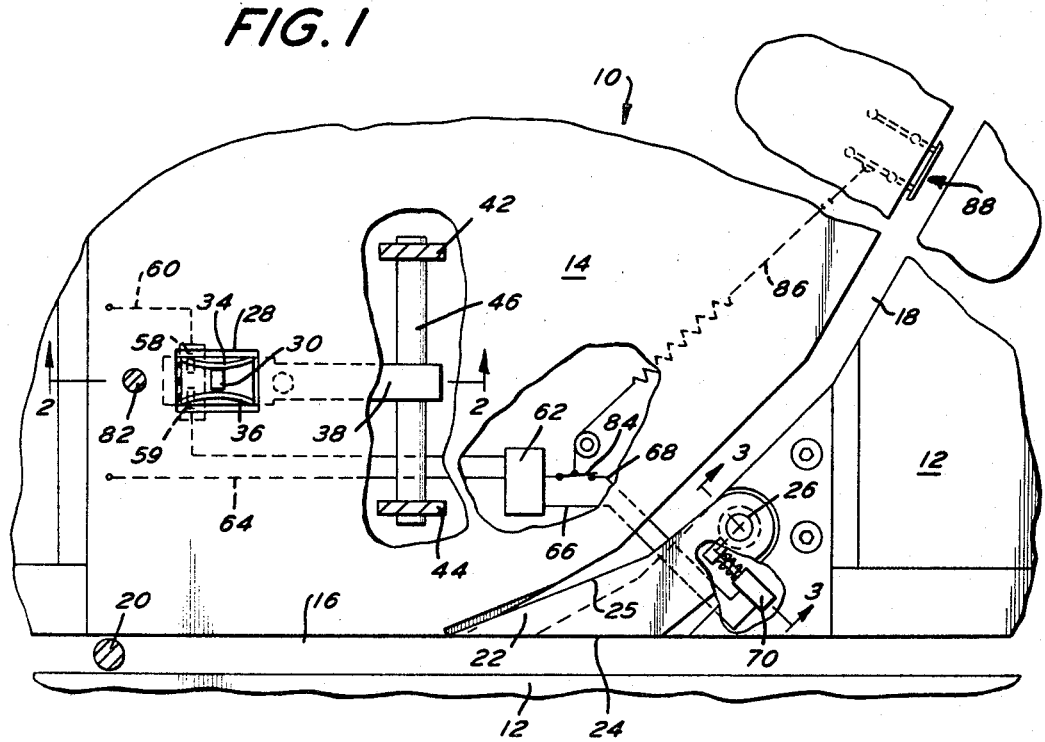
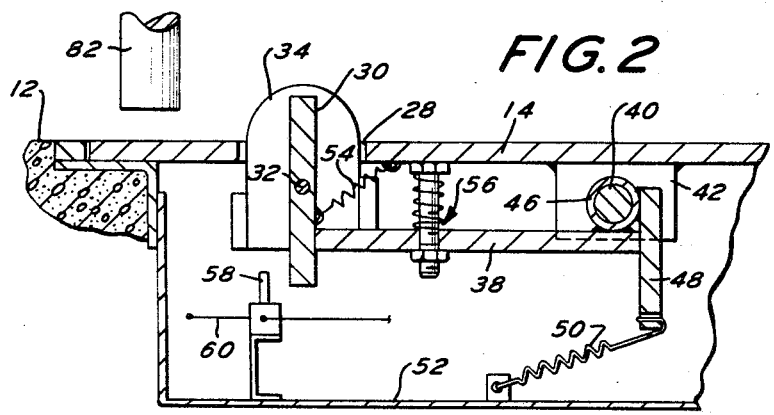
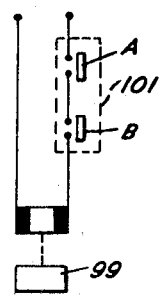
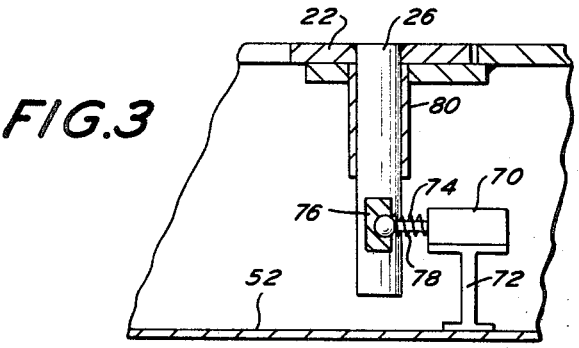
INVENTOR.
JOHN G. DORRANCE
BY Seidel & Gonda
ATTORNEYS.

June 18, 1968  J. G. DORRANCE  3,388,674
TOW TRUCK SYSTEM
Filed Sept. 9, 1965  2 Sheets-Sheet 2
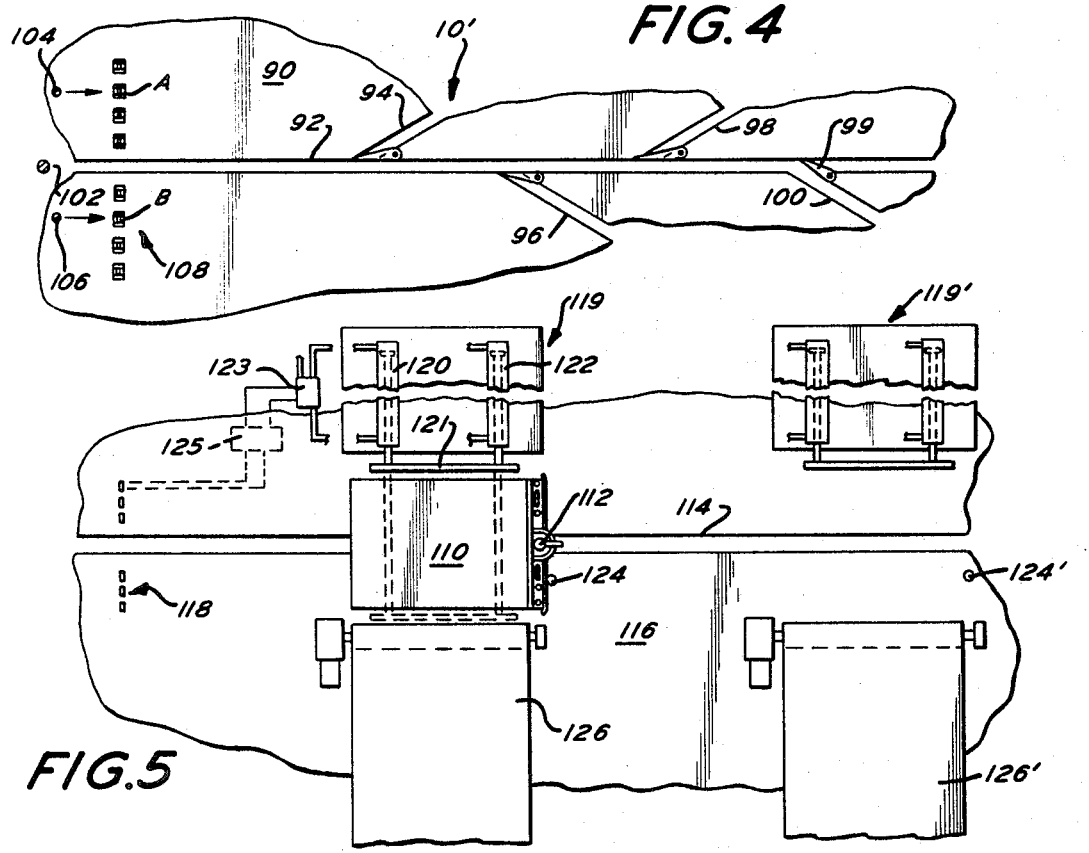
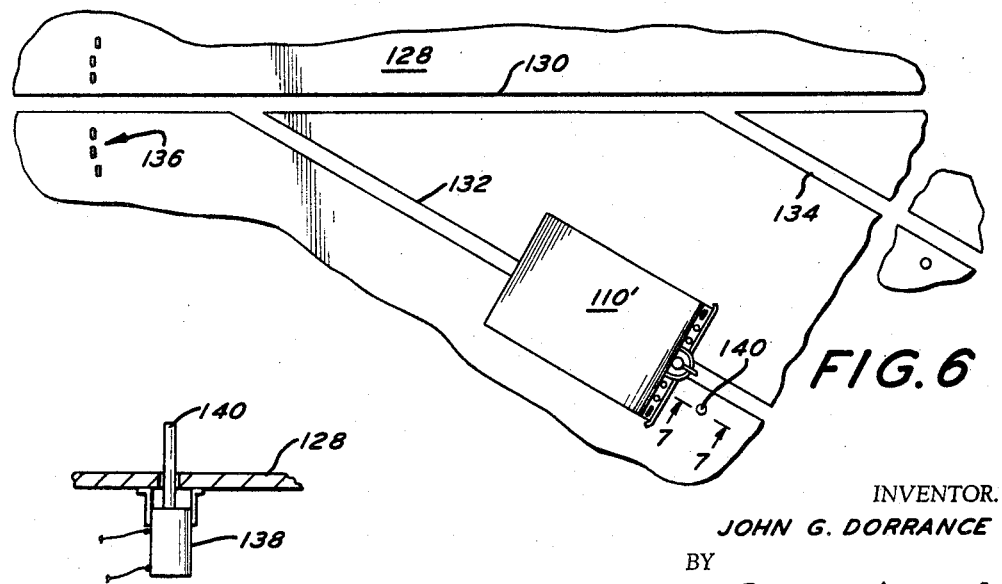
INVENTOR.
JOHN G. DORRANCE
BY
Seidel & Gonda
ATTORNEYS.

United States Patent Office 3,388,674
Patented June 18, 1968

3,388,674
TOW TRUCK SYSTEM
John G. Dorrance, Phillipsburg, N.J., assignor to SI Handling Systems, Inc., Easton, Pa., a corporation of Pennsylvania
Filed Sept. 9, 1965, Ser. No. 486,182
9 Claims. (Cl. 104—88)

ABSTRACT OF THE DISCLOSURE

An electrical control for tow trucks is described utilizing a floor mounted control actuating means adapted to be operated by the movement of a portion of the truck over such means. When operated the control actuating means initiates electrical circuitry containing components for controlling further movements and operations involving the tow truck.

---

This invention relates to a tow truck system, and more particularly, to a tow truck system wherein an electrical circuit component is supported by a reference surface and adapted to be actuated by a member on a truck mounted for movement along a main slot in the reference surface.

A reference surface such as a floor in a building may be provided with a main slot having one or more shunt slots intersecting the main slot. At the intersection of the slots, there may be provided a switch plate member mounted for rotation about an axis which is generally perpendicular to the plane of the reference surface. The switch plate member is normally biased to one side of the main slot.

Selectively operable means, preferably responsive to actuation by a selective pin on a tow truck, is provided to one side of the main slot. The selectively operable means is preferably in the form of a movable treadle member. When actuated, the treadle member contacts an electrical circuit component to close an electric circuit. The electrical circuit may be coupled to a solenoid operator for the switch plate member. Alternatively, the electrical circuit may be coupled to an abutment rod adapted to contact an accumulation bumper on a truck and thereby disconnect the tow pin on a truck from being coupled to a conveyor which normally propels the truck along the main slot.

Alternatively, the electrical circuit may include a supply and exhaust valve for controlling the flow of motive fluid to a power cylinder of a transfer device. When activated, the transfer device may be utilized to transfer the load on the truck to a conveyor or the like. Other alternatives, circuits and devices will suggest themselves to those skilled in the art such as the generation of a signal communicated to a memory device which will indicate and/or automatically cause the load to be stored in a particular location.

It is an object of the present invention to provide a novel tow truck system.

It is another object of the present invention to provide a subcombination for use in a tow truck system wherein a treadle adapted to be actuated by a portion of a tow truck will complete an electrical circuit which in some way effects the movement or destination of the truck.

It is another object of the present invention to provide a tow truck switching system having an electrically operated switch plate at the juncture of a main slot and a shunt slot.

It is another object of the present invention to provide a tow truck system having an electrically operated abutment rod for decoupling a tow truck from its propelling means.

It is another object of the present invention to provide a tow truck system wherein an electrically operated device is provided to cause the load on the truck to be transferred therefrom in response to a selectively controlled code arrangement on the truck.

Other objects will appear hereinafter.

For the purpose of illustrating the invention, there are shown in the drawings forms which are presently preferred; it being understood, however, that this invention is not limited to the precise arrangements and instrumentalities shown.

FIGURE 1 is a partial top plan view of a tow truck switching system in accordance with the present invention.

FIGURE 2 is a sectional view taken along the line 2—2 in FIGURE 1.

FIGURE 3 is a sectional view taken along the line 3—3 in FIGURE 1.

FIGURE 4 is a partial top plan view of a tow truck switching system in accordance with another embodiment of the present invention.

FIGURE 5 is a partial top plan view of a tow truck system in accordance with another embodiment of the present invention.

FIGURE 6 is a partial top plan view of a tow truck system in accordance with another embodiment of the present invention.

FIGURE 7 is a sectional view taken along the line 7—7 in FIGURE 6.

FIGURE 8 is a wiring diagram.

Referring to the drawing in detail, wherein like numerals indicate like elements, there is shown in FIGURE 1 a tow truck switching system designated generally as 10.

The system 10 includes a reference surface 12 such as the floor in a building or the like. A housing is provided in the floor 12 and provided with a movable top cover plate 14. The housing and plate 14 are provided in the floor 12 adjacent the intersection of main slot 16 and a shunt slot 18. Other shunt slots not shown will be provided at spaced points along the main slot 16 and may extend to either side of the main slot 16.

A tow truck of the type illustrated and described in U.S. Patent 2,619,370 may be utilized in conjunction with the present invention. The truck will have a tow pin 20 which enters the main slot 16 and is adapted to be propelled therealong by a conveyor means below the main slot 16. The conveyor means is not shown. Also, the truck having tow pin 20 may be propelled along slot 16 by means of a motor on the truck operatively coupled to wheels on the truck. By presetting or coding an arrangement of selector pins on the tow truck, such as those disclosed in U.S. Patent 3,094,944, a switch plate 22 may be caused to move from the solid line disposition illustrated in FIGURE 1 to permit the tow pin 20 to be transferred from movement along the main slot 16 to movement along the shunt slot 18.

The switch plate 22 is provided with a surface 24 which forms a continuation of or a part of the main slot 16. The switch plate 22 also includes a surface 25 which is adapted to extend across the main slot 16 and form a continuation of the shunt slot 18 when moved from the illustrated disposition. The switch plate 22 is provided with a pin 26 whose longitudinal axis is substantially perpendicular to the plane of the surface 12. A selectively operable means responsive to actuation by an element such as a selector pin on a tow truck is provided to selectively cause tow trucks to be transferred to the shunt slot 18.

The selectively operable means includes a treadle member 30 pivotably supported by protection plates 34 and 36 for rotation about the axis of pin 32. The axis of pin 32 is substantially perpendicular to the main slot 16. The protection plates 34 and 36 are arcuately disposed as illustrated in FIGURE 1 on opposite sides of the treadle member 30. Plates 34 and 36 and treadle member 30 project upwardly through an aperture 28 in the plate 14 as shown more clearly in FIGURE 2.

The protection plates 34 and 36 are supported at one end of a substantially horizontally disposed lever arm 38. Lever arm 38 is connected to a sleeve 46 disposed around a horizontally disposed pin 40. The ends of pin 40 are supported by brackets 42 and 44 depending from the plate 14.

An arm 48 is connected to sleeve 46 and depends downwardly therefrom in a direction substantially perpendicular to the longitudinal axis of arm 38. A spring 50 has one end coupled to arm 48 and its other end coupled to the bottom wall 52 of a cup-shaped housing below plate 14. A spring 54 has one end coupled to the undersurface of plate 14. The other of spring 54 is coupled to the treadle member 30 and biases the same to an upright disposition as illustrated in FIGURE 2. An adjustable limit stop 56 is provided to adjust the disposition of the selectively operable means. Thus, spring 50 biases arm 38 in a clockwise direction in FIGURE 2. Limit stop 56 includes a head bolt extending through a hole in arm 38 and having a nut threaded thereto. A spring surrounds the bolt and biases the head thereon into contact with the undersurface of the plate 14.

A component of an electrical circuit is mounted within the housing for cooperation with the treadle member 30. The component may be an electrical switch or as illustrated wherein a pair of contacts 58 and 59 are provided in a conductor 60. The contacts 58 and 59 are adapted to be bridged by the treadle member 30 to complete a circuit from a source not shown through conductors 60 and 64 to a timer 62. As soon as timer 62 is actuated, a relay is closed so as to keep the circuit completed across contacts 58 and 59 not withstanding the fact that the treadle member 30 no longer bridges the contacts 58 and 59. When the timer 62 times out, the circuit is broken.

The timer 62 is coupled to a solenoid 70 by way of conductors 66 and 68. The solenoid 70 is mounted on a support 72 within the housing beneath the plate 14. The solenoid 70 is provided with a plunger rod 74 connected by a swivel coupling to a connector arm 76. Arm 76 has one end connected to the pin 26. The pin 26 is supported within a guide sleeve 80 depending from the plate 14.

A switch 84 is provided within the conductor 68. Switch 84 is normally closed. Switch 84 is connected by way of a flexible cable 86 to a parallelogram switch 88. Switch 88 projects into the shunt slot 18. When actuated, switch 88 causes the cable 86 to open switch 84. When switch 74 is opened, the switch plate 22 will remain in its closed disposition and no additional trucks may be shunted along slot 18. The spring 78 surrounding the rod 84 maintains the switch plate 22 in the closed disposition illustrated. It is within the scope of the invention to orientate the solenoid 70, plunger rod 74 and spring 78 on the opposite side of arm 76 so that the switch plate 22 is biased open.

The operation of the system 10 is as follows:

It will be assumed that a selector pin, such as pin 82, has been preset on a tow truck so that the truck will be dispatched along main slot 16 and is destined to be shunted along slot 18. The truck will be propelled along the main slot 16 by engagement with the tow pin 20 and a conventional conveyor. As the truck moves along the main slot 16, and approaches the intersection with slot 18, the selector pin 82 will engage the treadle member 30 and rotate the same in a clockwise direction in FIGURE 2. Such movement will be opposed by the spring 54. As the treadle member 30 rotates, it will bridge the contacts 58 and 59.

Electric current is now coupled through the timer 62 to the solenoid 70. When activated, the solenoid 70 will cause the plunger rod 74 to be retracted thereby rotating the switch plate 22 in a counterclockwise direction in FIGURE 1. By this time, the treadle member 30 will have been deflected by the selector pin 82 and will have resumed its position illustrated in FIGURE 2 under the bias of spring 54. The switch plate 22 will remain in the position wherein surface 25 thereon obstructs the main slot 16. As the tow pin 20 approaches the intersection of shunt slot 18 and main slot, it will contact surface 25 and the truck will be shunted along slot 18.

When the timer 62 times out, the circuit will be broken and spring 74 will take over and move the switch plate 22 to the illustrated disposition in FIGURE 1 by rotating the same about the longiutdinal axis of pin 26. When a predetermined number of trucks have accumulated along the shunt slot 18, the parallelogram switch 88 will be biased by contact with the tow pin and held in such baised position thereby opening switch 84. Thereafter, no additional trucks may be shunted along slot 18.

The treadle member 30 may only be actuated by contact with the member moving in a direction substantially parallel to main slot 16. Thus, the treadle member 30 cannot be actuated by contact with a member moving in a direction substantially perpendicular to main slot 16. The protection plates 34 and 36 protect the treadle member 30 from abuse as a result of forces directed from a sidewise direction. If a workman inadvertently steps on the treadle member 30, the shoe of the workman will first contact the protection plates 34 and 36 and cause the selectively operable means to move into the floor. When the selectively operable means moves into the floor, it is pivoting about the longitudinal axis of pin 40 against the bias of spring 50. As soon as the workman takes his foot off the selectively operable means, the spring 50 will cause the elements to resume the position shown in FIGURE 2. The same effect is attained if the selectively operable means is run over by the wheels of a fork lift truck or some other vehicle. Thus, the present invention finds great use in areas such as warehouses, piers, loading docks, etc. wherein a large number of persons and wheeled vehicles are constantly moving throughout the area. It will be noted that the lefthand end of the lever arm 38 acts as a limit stop for the treadle member 30 so that the treadle member 30 is maintained in an upright disposition by the spring 54.

In FIGURE 4, there is illustrated another embodiment of the present invention wherein the system is designated generally as 10'. The system 10' is identical with the system 10 except as will be made clear hereinafter. Thus, the system 10' includes a reference surface 90 having a main slot 92. The main slot 92 is intersected at spaced points therealong by shunt slots 94, 96, 98 and 100. A switch plate, such as switch plate 22, is provided to control the intersection of the main slot with each of the shunt slots. As illustrated in FIGURE 4, the switch plate at the intersection of slots 92 and 100 is in an open disposition.

For the purposes of this disclosure, a truck such as those described above may be provided having a tow pin 102 extending into the main slot 92 and having a pair of selector pins 104 and 106 on opposite sides of the truck. Instead of a single treadle member 30, the system 10' includes a bank 108 of such treadle members supported in the identical manner as described above. Some of the treadle members are on one side of the main slot and the remaining are on the opposite side of the main slot 92. In order to effect operation of one of the switch plates, a pair of treadle members must be simultaneously actuated. Each member of the pair need not be on the same side of the main slot.

As illustrated, treadle member A is adapted to be contacted by selector pin 104 and treadle member B is adapted to be contacted by selector pin 106. The treadle members A and B are coupled to separate electrical components disposed in series and electrically coupled to the switch plate 99 controlling entrance into shunt slot 100 as illustrated in FIGURE 8. When simultaneously contacted, the treadle members A and B close an electric circuit having a timer 101 as described above to effect movement of the switch plate at the intersection of slots 92 and 100 as described above. The treadle members of bank 108 may be coupled to a console or panel with indicating lights to indicate which of the switch members have been activated to an open position. By having a bank of treadle members, installation of the system 10' will be substantially reduced and the maintenance will be substantially easier since all of the treadle members and switch members together with their associated timers will be at the same location. It will be understood that each of the other switch plates controlling the intersection of a shunt slot and the main slot of system 10' will likewise be coupled to a pair of the treadle members of bank 108.

It will be understood that the number of treadle members of bank 108 corresponds to the number of positions for selector pins on the truck. Thus, if a truck is provided with ten selector pin positions on opposite sides of the tow pin, that truck could be switched into any one of a hundred different shunt slots. Accordingly, there will be ten treadle members on each side of the main slot 92.

In FIGURE 5, there is illustrated another embodiment of the present invention wherein a tow truck 110 has a tow pin 112 extending into a main slot 114 on a reference surface such as floor 116. A bank of treadle members 118 is provided, with some of the treadle members on opposite sides of the main slot 114. Instead of completing an electrical circuit to operate a switch plate, the treadle members of bank 118 are electrically coupled to a circuit capable of effecting operation of transfer mechanisms such as a gear motor, hydraulic mechanism, etc. A plurality of transfer mechanisms will be provided at spaced points along the main slot 114 or along a shunt slot. The transfer mechanisms illustrated are hydraulic and designated as 119 and 119'. Mechanisms 119 and 119' are identical. Hence, only mechanism 119 will be described in detail.

The transfer mechanism 119 includes a pair of power cylinders 120 and 122 disposed so that their longitudinal axis is substantially perpendicular to slot 114. The piston rods associated with the cylinders 120 and 122 at their ends adjacent the main slot 114 are interconnected by a ram 121. Motive fluid is selectively introduced into the power cylinders 120 and 122 and controlled by a supply and exhaust valve 123. Valve 123 is solenoid operated and electrically coupled through a timer 125 to one or more of the treadle members of bank 118.

An abutment rod 124 is associated with the transfer mechanism 119. A corresponding rod 124' is associated with mechanism 119'. When electrical power is coupled to complete a circuit to the solenoid of valve 123, it is also coupled to a solenoid to cause rod 124 to move upwardly through the floor 116 and thereby provide an abutment for engagement with the bumper or some other portion of the truck 110. When the bumper or some other portion on truck 110 engages rod 124, the tow pin 112 is immediately raised or otherwise moved out of contact with the conveyor (or opens an electric circuit on the truck) and thereby causes the truck 110 to cease moving along the main slot 114. Thereafter, the ram 121 will transfer the load on truck 110 by pushing the same onto a juxtaposed conveyer 126. The conveyor 126 may then transfer the load to a suitable storage area.

In some installations, the speed of movement of the truck 110 along the main slot 114 may be slow enough so as not to require the necessity of an abutment rod 124. That is, the load may be transferred by the ram 121 onto the conveyor 126 while the truck 110 is moving. The actual transferring action only takes two or three seconds. If an abutment rod such as 124 is utilized, it will be retracted when the timer 125 times out. Thereafter, the tow pin 112 will be in a position so that it may be contacted by the next dog on the conveyor and will thereafter resume its movement along the main slot 114. The transfer mechanism of FIGURE 5 may be utilized in conjunction with the system 10 or 10'. That is, after the load has been transferred to the conveyor 126, the truck 110 may be caused to enter one of the shunt slots or may be recycled to a loading area.

When the timer 125 times out, the solenoid of valve 123 will actuate the valve to a position wherein the ram 121 will be retracted to the solid line position illustrated in FIGURE 5. In view of the above description, additional details of operation are not considered necessary.

In FIGURE 6, there is illustrated another embodiment of the present invention wherein a reference surface 128 such as a floor is provided with a main slot 130 and a plurality of shunt slots such as 132 and 134. The shunt slots intersect the main slot 130. Such intersection need not be provided with a switch plate. Instead, the actual switching of the trucks for movement along the main slot 130 to a desired shunt slot such as slot 132 may be effected by means of structure such as that illustrated and described in U.S. Patent 3,174,439. A bank 136 of treadle members may be provided with a portion thereof on opposite sides of the main slot 130.

When one or more of the treadle members of bank 136 are activated by contact with a selector pin on a truck, an electrical circuit may be completed to a solenoid 138. Solenoid 138 when activated causes abutment rod 140 to move upwardly and provide an abutment for the bumper on the truck. In this manner, the truck 110' may be caused to stop at any predetermined point along the shunt slot 132. Shunt slot 132 may be provided with independent conveyor to propel the truck 110' therealong if desired. A corresponding abutment rod may be provided at one or more points along the length of the shunt slots 132 and 134. Abutment rod 140 and its actuator are identical with rod 124.

Thus, it will be noted that the present invention provides a selectively operable means structurally interrelated with an electrical circuit to effect any one of a wide variety of devices which control the movement of the tow truck or the load thereon. A variety of electrically operable devices for use in the electrical circuit will suggest themselves to those skilled in the art.

The present invention may be utilized for new installations. Also, existing installations may be modified at slight cost to incorporate the principles of the present invention. The systems of the present invention are simple, substantially maintenance-free, quiet, and reliable.

Each of the treadle members of banks 108, 118 and 136 are preferably mounted in the same manner as treadle member 30. While a treadle member mounted for pivotable movement is illustrated in the drawings and described above, it will be appreciated by those skilled in the art that in its broadest sense, the present invention encompasses the possibility of utilizing a movable member mounted between the protection plate 34 for reciprocal as well as pivotable movement. When the member is mounted for reciprocal movement, it is preferably supported for reciprocal movement having a downward component so that it may be moved downwardly to a position where it will be cleared by the lower end of the selector pin.

The electrical circuit coupled to the treadle members may include or be associated with a stacking-storage system having a large number of cubicles. When the truck is caused to stop, such as by use of abutment rod 140, an automatic storage device simultaneously activated will take the load off the truck and store it in one of the cubicles. The information input data as to which shunt slot the truck is to be dispatched to and the particular cubicle the load is to be stored in is effected by the selector pins on the truck orientated to contact the proper treadle members associated with corresponding electrical circuits.

The present invention may be embodied in other specific forms without departing from the spirit or essential attributes thereof and, accordingly, reference should be made to the appended claims, rather than to the foregoing specification as indicating the scope of the invention.

What is claimed is:
1. A tow truck system comprising a slot along which a tow truck may be mounted for movement with a tow pin on the truck extending into the slot, a movable treadle member supported to one side of said slot and mounted for contact with a truck supported selector pin, protector means associated with said treadle member to protect said treadle member from inadvertent actuation, means alongside said slot for effecting transfer of a load from a truck, an electrical circuit coupling said transfer means to an electrical component, said component being juxtaposed to said member for actuation thereby when the member is contacted by a truck supported selector pin.

2. A system in accordance with claim 1 including a conveyor alongside said slot and associated with said transfer means, said conveyor being positioned to receive the load transferred by said transfer means.

3. A tow truck system comprising a main slot along which a tow truck may be propelled, a plurality of shunt slots each intersecting the main slot and along which the truck may be shunted, a bank of movable members, portions of said bank being on opposite sides of the main slot and at the same elevations, each having at least two members, each member of said bank being mounted for contact with a truck supported actuator, a plurality of movable elements at spaced points along the main slot for controlling movement of a truck traveling along the main slot, an electrical circuit coupling each member to at least one of said elements, each circuit including an electrical component mounted for actuation by a movable member.

4. A system in accordance with claim 3 wherein each circuit includes at least two such electrical components in series whereby at least two of the movable members must be actuated substantially simultaneously in order to complete a circuit effective to actuate a movable element.

5. A system in accordance with claim 3 including protector means associated with each of said members to prevent inadvertent actuation thereof.

6. A system in accordance with claim 3 wherein at least some of said movable elements are switch members, each such switch member being mounted for controlling the intersection of the main slot with one of the shunt slots.

7. A system in accordance with claim 3 wherein said circuit includes a timer means for automatically controlling the circuit.

8. A tow truck system comprising a floor having a main slot along which a tow truck may be mounted for movement, a movable member supported by the floor to one side of said main slot and mounted for contact with a truck supported pin, an abutment rod in the floor along said slot and to one side of said slot, said abutment rod being mounted in an upright position, an electrical circuit for effecting upward movement of said rod from an inoperative position to a position wherein it engages with a portion of a truck to effect a stopping of the truck thereat, said circuit including an electrical component associated with said member for actuation by said member when said member is contacted movable by the truck supported pin.

9. An electrically controlled tow truck system comprising a main slot along which a tow truck may be mounted for movement, a movable treadle member supported by the floor to one side of the main slot and mounted for contact with a truck supported pin, protector means associated with said treadle member to prevent said treadle member from inadvertent actuation, said treadle member being supported by said protector means for movement into the floor when subjected to an inadvertent force applied against the protector means, an electrical circuit component mounted in a housing below said treadle member and positioned for actuation by said treadle member, a truck control element mounted for movement between first and second positions, an electrical circuit coupling said electrical circuit component and said element, said element being capable of controlling movement of a tow truck moving along said main slot when said element is in its second position, said circuit comprising electrically conductive means and an electrical device adapted to move said element between said positions, said electrically conductive means coupled to said device and to a source of electrical potential, whereby actuation of said electrical device by said electrical circuit component moves said element between said positions, and said electrical circuit including a timer for maintaining said electrical device coupled to said source of electrical potential through said conductive means notwithstanding the fact that the treadle member is no longer coupled to said electrical circuit component.

References Cited

UNITED STATES PATENTS

| | | | |
|---|---|---|---|
| 3,261,300 | 7/1966 | Johnson | 104—88 |
| 3,174,438 | 3/1965 | Hariton | 104—88 |
| 3,056,360 | 10/1962 | Barmeister et al. | 104—88 X |
| 2,893,535 | 7/1959 | Kay | 104—88 X |
| 1,402,558 | 1/1922 | Weber et al. | 104—91 X |

EUGENE G. BOTZ, *Primary Examiner.*

ARTHUR L. LAPOINT, *Examiner.*

S. B. GREEN, *Assistant Examiner.*